United States Patent
Tsuji et al.

(10) Patent No.: US 9,823,341 B2
(45) Date of Patent: Nov. 21, 2017

(54) ULTRASONIC SENSOR

(71) Applicant: Panasonic Intellectual Property Management Co., Ltd., Osaka (JP)

(72) Inventors: Takashi Tsuji, Mie (JP); Osamu Hirakawa, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 50 days.

(21) Appl. No.: 14/442,175

(22) PCT Filed: Nov. 6, 2013

(86) PCT No.: PCT/JP2013/006542
§ 371 (c)(1),
(2) Date: May 12, 2015

(87) PCT Pub. No.: WO2014/076908
PCT Pub. Date: May 22, 2014

(65) Prior Publication Data
US 2016/0291139 A1    Oct. 6, 2016

(30) Foreign Application Priority Data

Nov. 13, 2012    (JP) ................. 2012-249365

(51) Int. Cl.
*G08G 1/04*    (2006.01)
*G01S 7/521*    (2006.01)
(Continued)

(52) U.S. Cl.
CPC ............ *G01S 7/521* (2013.01); *B60R 19/483* (2013.01); *G01S 15/04* (2013.01); *G01S 15/931* (2013.01);
(Continued)

(58) Field of Classification Search
CPC .............. A61M 1/0088; A61M 1/0001; A61M 1/0031; A61M 2205/075; A61M 1/0072;
(Continued)

(56) References Cited

U.S. PATENT DOCUMENTS 5,999,268 A * 12/1999 Yonezawa .......... G01R 31/2887
324/750.19
6,262,513 B1 * 7/2001 Furukawa ............... H01L 21/56
257/E21.502
(Continued)

FOREIGN PATENT DOCUMENTS

JP    H10-162908 A    6/1998
JP    2005-326181 A    11/2005
(Continued)

OTHER PUBLICATIONS

International Search Report issued in PCT/JP2013/006542, dated Dec. 10, 2013, with English translation.
(Continued)

*Primary Examiner* — Daniel Previl
(74) *Attorney, Agent, or Firm* — McDermott Will & Emery LLP

(57) ABSTRACT

The ultrasonic sensor includes a wave transmitting and receiving device and a cover. The wave transmitting and receiving device has a front surface including a wave transmitting and receiving surface and is configured to transmit and receive an ultrasonic wave through the wave transmitting and receiving surface. The cover covers the wave transmitting and receiving device so as to expose the wave transmitting and receiving surface. The cover is constituted by multiple portions, and the multiple portions are individually made of multiple materials different from each other.

5 Claims, 5 Drawing Sheets

(51) Int. Cl.
  *G01S 15/93* (2006.01)
  *B60R 19/48* (2006.01)
  *G10K 9/22* (2006.01)
  *G10K 11/00* (2006.01)
  *H04R 17/00* (2006.01)
  *G01S 15/04* (2006.01)

(52) U.S. Cl.
  CPC .............. *G10K 9/22* (2013.01); *G10K 11/002* (2013.01); *H04R 17/00* (2013.01); *G01S 2015/938* (2013.01)

(58) Field of Classification Search
  CPC .. A61M 1/0003; A61M 1/0011; A61M 1/005; A61M 1/0052; A61M 1/009; A61M 1/0092; A61M 35/00; A61M 1/0023; A61M 1/0056
  USPC ....... 340/943, 939, 506, 508, 521–522, 517, 340/501, 531, 446, 488, 539.22, 683
  See application file for complete search history.

(56) References Cited

U.S. PATENT DOCUMENTS

| | | | |
|---|---|---|---|
| 9,176,220 B2 | 11/2015 | Urase et al. | |
| 2006/0232081 A1* | 10/2006 | Sato | B60R 19/483 293/117 |
| 2008/0098816 A1* | 5/2008 | Yamashita | G10K 11/002 73/596 |
| 2008/0307888 A1* | 12/2008 | Yoshioka | B60Q 1/0023 73/627 |
| 2009/0054784 A1* | 2/2009 | Okuda | G01S 7/521 600/459 |
| 2009/0302712 A1* | 12/2009 | Ota | G10K 9/122 310/334 |
| 2011/0277550 A1 | 11/2011 | Abe et al. | |
| 2011/0316388 A1* | 12/2011 | Akiyama | B06B 3/00 310/334 |
| 2012/0176866 A1 | 7/2012 | Urase et al. | |
| 2012/0269031 A1* | 10/2012 | Huffman | G01N 29/245 367/7 |
| 2013/0250732 A1 | 9/2013 | Tsuji et al. | |

FOREIGN PATENT DOCUMENTS

| | | |
|---|---|---|
| JP | 2011-053109 A | 3/2011 |
| JP | 2011-244100 A | 12/2011 |
| JP | 2012-026878 A | 2/2012 |
| JP | 2012-100042 A | 5/2012 |
| JP | 2012-122936 A | 6/2012 |

OTHER PUBLICATIONS

Chinese Office Action issued in Chinese Application No. 201380058955.6 dated Jul. 4, 2016, with English Translation.

* cited by examiner

ULTRASONIC SENSOR

RELATED APPLICATIONS

This application is the U.S. national Phase under 35 § 371 of International Application No. PCT/JP2013/006542, filed on Nov. 6, 2013, which in turn claims the benefit of Japanese Application No. 2012-249365, filed on Nov. 13, 2012, the disclosures of which Applications are incorporated by reference herein.

TECHNICAL FIELD

The present invention relates to ultrasonic sensors.

BACKGROUND ART

In the past, there has been provided an ultrasonic sensor configured to transmit an ultrasonic wave and receive an ultrasonic wave reflected by an obstacle. Such an ultrasonic sensor may be attached to a bumper of a vehicle as disclosed in document 1 (JP 2012-122936 A), for example.

The ultrasonic sensor disclosed in the document 1 includes two mounting bases to be bonded to an inner surface of the bumper, and a sensor body holding a transceiver to transmit and receive ultrasonic waves. The respective mounting bases and the sensor body include connection parts allowing detachable connection between the mounting bases and the sensor body. To fix the ultrasonic sensor to the bumper, at first the two mounting bases are respectively attached to opposite sides of an exposing hole penetrating the bumper. Thereafter, the connection parts of the sensor body are connected to the respective mounting bases respectively, and thereby the ultrasonic sensor is fixed to the bumper.

In the above conventional example, while the ultrasonic sensor is fixed to the bumper, an ultrasonic wave transmitting and receiving surface is flush with an outer surface of the bumper. However, there are some ultrasonic sensors including a part slightly protruded from the exposing hole to conceal an inner surface of the exposing hole (attachment hole). In general ultrasonic sensors, to attenuate unwanted vibration, the transceiver is covered with a cover made of elastic material. In the above configuration, part of the cover slightly protrudes from the attachment hole.

However, in this configuration, for example, when the bumper is wiped with a towel in car washing or waxing, the towel may strike the part of the cover protruding from the attachment hole and therefore external force may be applied to such part. This may cause rolling up of part of the cover and hence a partial lift of the cover is likely to occur (part of the cover is likely to be lifted).

SUMMARY OF INVENTION

In view of the above insufficiency, the present invention has aimed to propose an ultrasonic sensor capable of suppressing a partial lift of the cover caused by external force (suppressing part of the cover from being lifted by external force).

The ultrasonic sensor of the first aspect in accordance with the present invention includes a wave transmitting and receiving device and a cover. The wave transmitting and receiving device has a front surface including a wave transmitting and receiving surface and is configured to transmit and receive an ultrasonic wave through the wave transmitting and receiving surface. The cover covers the wave transmitting and receiving device so as to expose the wave transmitting and receiving surface. The cover is constituted by multiple portions, and the multiple portions are individually made of multiple materials different from each other.

The ultrasonic sensor of the second aspect in accordance with the present invention, realized in combination with the first aspect, further includes a sensor body accommodating the wave transmitting and receiving device and the cover so as to expose the wave transmitting and receiving surface.

In the ultrasonic sensor of the third aspect in accordance with the present invention, realized in combination with the first aspect, the cover includes a side portion covering a side surface of the wave transmitting and receiving device, and a bottom portion which covers a bottom surface of the wave transmitting and receiving device and is made of a material different from a material of the side portion. The material of the bottom portion has a greater elastic modulus than the material of the side portion.

In the ultrasonic sensor of the fourth aspect in accordance with the present invention, realized in combination with the third aspect, the side portion of the cover is made of silicone rubber. The bottom portion is made of silicone rubber having a greater elastic modulus than the silicone rubber for making the side portion.

In the ultrasonic sensor of the fifth aspect in accordance with the present invention, realized in combination with the first aspect, the cover is provided as a single object by forming the multiple portions integrally by simultaneous molding.

In the ultrasonic sensor of the sixth aspect in accordance with the present invention, realized in combination the first aspect, the cover is provided as a single object by bonding the multiple portions together.

DESCRIPTION OF EMBODIMENTS

Figure 1A:
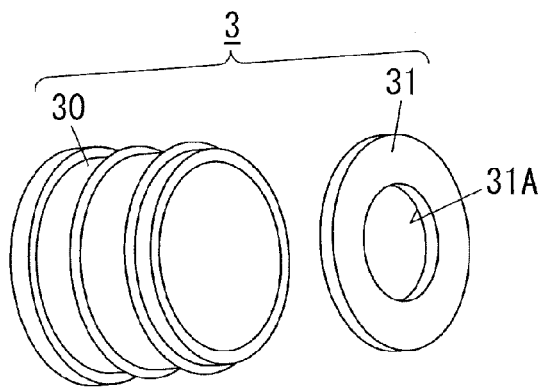
FIGS. 1A and 1B are perspective views each illustrating the cover of the ultrasonic sensor of one embodiment in accordance with the present invention.

The following explanations referring to drawings are made to an ultrasonic sensor 100 of one embodiment in accordance with the present invention. Note that, in the following explanations, front-back directions are defined by a bidirectional arrow shown in FIG. 1C. The ultrasonic sensor 100 of the present embodiment is, as shown in FIGS. 1A to 2B, attached to a bumper A10 of a vehicle A1 and primarily includes a sensor body 1, a wave transmitting and receiving device 2 and a cover 3. The ultrasonic sensor 100 of the present embodiment is, as shown in FIG. 2A, used by setting the sensor body 1 in an attachment hole A11 penetrating the bumper A10 of the vehicle A1. The ultrasonic sensor 100 of the present embodiment is configured to judge whether an obstacle is present within a detection area (area surrounded with a dotted line shown in FIG. 2B), by sending an ultrasonic wave forward or backward from the vehicle A1. Note that the detection area shown in FIG. 2B is one example, and there is no intention to limit the detection area to the area surrounded with the dotted line.

The sensor body 1 is formed into a hollow cylindrical shape with an open front face and a closed back face. In other words, the sensor body 1 is formed into a hollow cylindrical shape and has a bottom portion at a back end of the sensor body 1. The sensor body 1 accommodates the wave transmitting and receiving device 2, the cover 3 and a circuit board (not shown) inside. A control circuit (not shown) for processing ultrasonic signals transmitted or received through the wave transmitting and receiving device 2 is mounted on the circuit board. As shown in FIG. 2A, there are a pair of fixing parts 4 and a connector 10 provided to an outer surface of the sensor body 1. The pair of fixing parts 4 are arranged so that the sensor body 1 is positioned between the pair of fixing parts 4. The connector 10 is used for making connection with an external power source (not shown).

The wave transmitting and receiving device 2 includes a piezoelectric element (not shown) to transmit and receive an ultrasonic wave and a case 20 to accommodate the piezoelectric element. The case 20 is made of aluminum, for example. The case 20 is formed into a hollow cylindrical shape with an open front face and a closed back face. In other words, the case 20 is formed into a hollow cylindrical shape and has a bottom portion at a back end of the case 20. By filling an inside of the case 20 with filler, the piezoelectric element is encapsulated in the case 20. A front end of the case 20 serves as a wave transmitting and receiving surface 21. That is, an ultrasonic wave is transmitted and received through the wave transmitting and receiving surface 21 present at a front surface of the wave transmitting and receiving device 2. A disk-shaped spacer 22 made of silicone rubber, for example, and a disk-shaped base 23 made of resin material are attached to a back end of the case 20. The spacer 22 and the base 23 are to suppress transmission of vibration of the piezoelectric element backward.

A pair of bar-shaped terminals 24 connected to the piezoelectric element project from a back end of the case 20 backward. The respective terminals 24 penetrate through the spacer 22 and the base 23, and project backward by passing through an after-mentioned hole 31A of the cover 3. The respective terminals 24 are connected to the control circuit mounted on the circuit board.

Figure 1B:
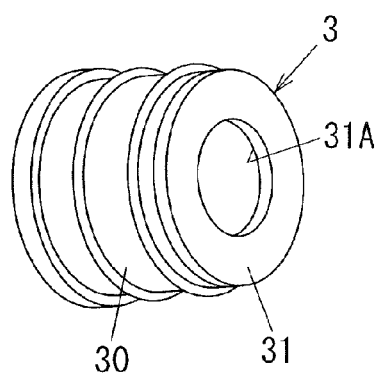
Figure 2A:
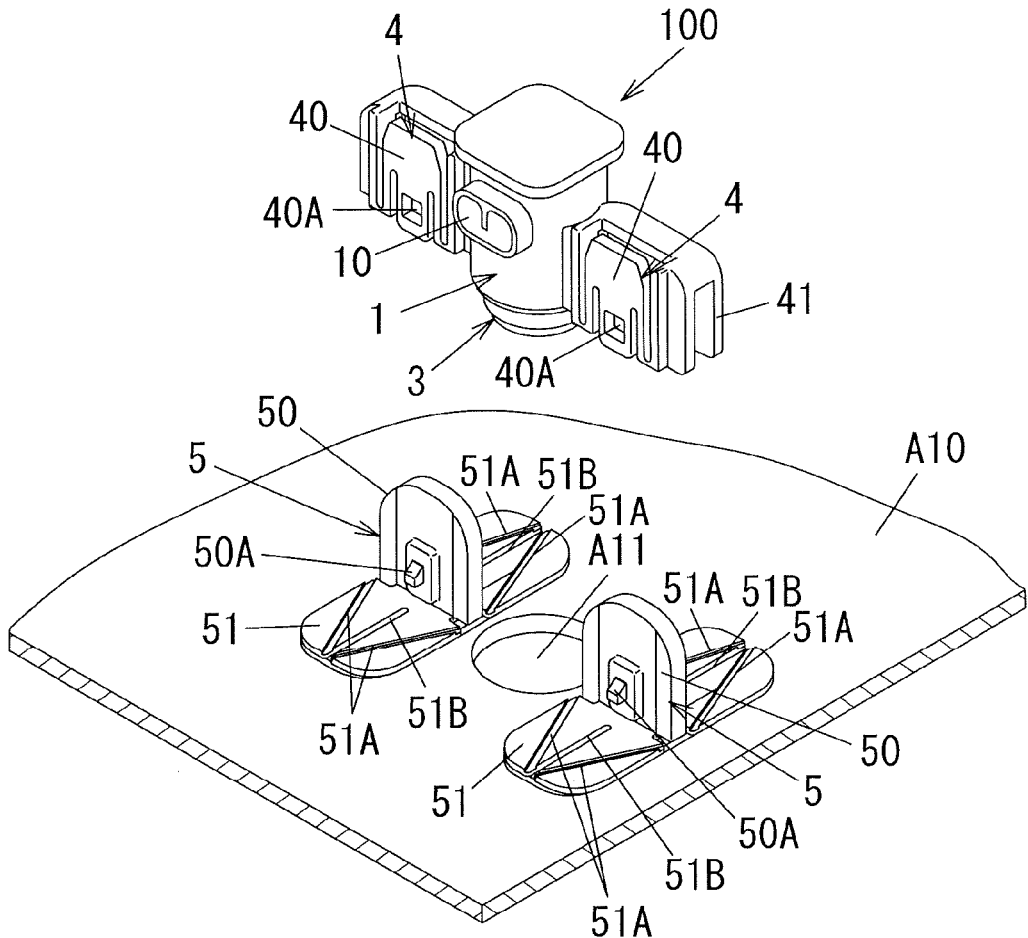
FIG. 2A is a schematic perspective view illustrating the ultrasonic sensor of the embodiment in accordance with the present invention.
Figure 2B:
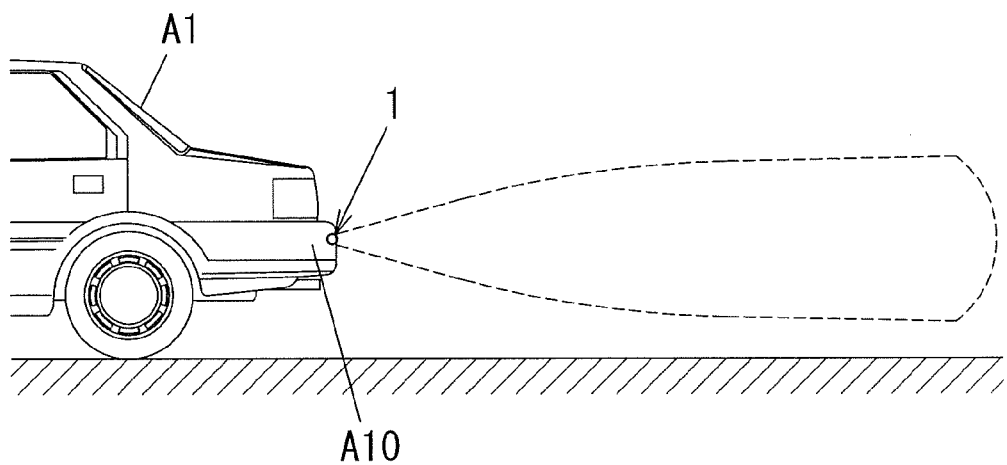
FIG. 2B is a view illustrating a use situation of the ultrasonic sensor of the embodiment in accordance with the present invention.

As shown in FIGS. 1A and 1B, the cover 3 is formed into a hollow cylindrical shape with an open front face and a closed face. In other words, the cover 3 is formed into a hollow cylindrical shape and has a bottom portion 31 at a back end of the cover 3. The cover 3 covers the wave transmitting and receiving device 2 so as to expose the wave transmitting and receiving surface 21 for ultrasonic waves. The cover 3 is provided as a single object by forming a side portion 30 covering a side surface of the wave transmitting and receiving device 2, and a bottom portion 31 covering a bottom surface of the wave transmitting and receiving device 2 by simultaneous molding. Alternatively, the cover 3 may be provided as a single object by bonding the side portion 30 and the bottom portion 31 together. The bottom portion 31 of the cover 3 includes the hole 31A having a round shape and allowing passage of the respective terminals 24 to project from the case 20.

The fixing part 4 is made of resin material, for example. As shown in FIG. 2A, the fixing part 4 includes a first main piece 40 and a second main piece 41 which are formed as a single object. The first main piece 40 and the second main piece 41 each are formed into a quadrangular shape and they are spaced at a predetermined interval in a thickness direction. The first main piece 40 and the second main piece 41 are interconnected at their back ends (upper ends in FIG. 2A). The first main piece 40 is formed to be flexible in a thickness direction. The first main piece 40 has a quadrangular insertion hole 40A penetrating through the first main piece 40. The insertion hole 40A is to receive a projection 50A of a mounting base 5 which is described below.

The mounting base 5 is made of resin material, for example. As shown in FIG. 2A, the mounting base 5 includes a standing piece 50 and an attachment piece 51 which are formed as a single object. The attachment piece 51 is formed into a quadrangular plate shape having round corners. The attachment piece 51 is attached to a rear surface (upper surface in FIG. 2A) of the bumper A10 by use of an adhesive sheet 52. Multiple grooves 51A and multiple slits 51B are formed in a rear surface (upper surface in FIG. 2A) of the attachment piece 51. By bending the attachment piece 51 at thin portion resulting from formation of the grooves 51A and/or changing width of the slits 51B, the attachment piece 51 may be changed in shape to fit the shape of the bumper A10.

The standing piece 50 is formed into a quadrangular plate shape having round-shaped corners at a back end thereof. The standing piece 50 projects backward from a center of the attachment piece 51 in a length direction. The standing piece 50 is formed into such a size to enable the standing piece 50 to be inserted between the main pieces 40 and 41 of the fixing part 4. Further, the projection 50A is formed integrally with one surface (near face in FIG. 2A) of the standing piece 50 in a thickness direction so as to protrude in a direction to which the one surface is directed. When the standing piece 50 is inserted in a space formed between the first main piece 40 and the second main piece 41, the projection 50A is received by the insertion hole 40A.

Figure 3A:
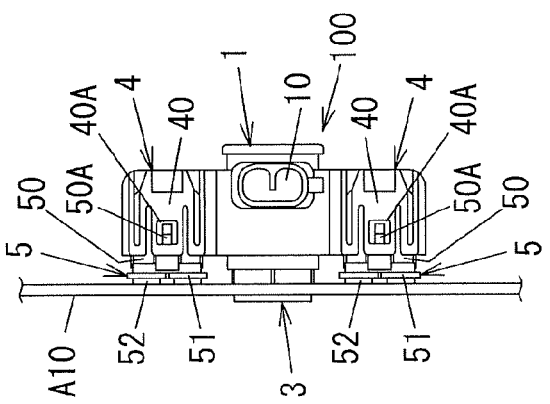
FIGS. 3A to 3C are views each illustrating how to attach the ultrasonic sensor of the embodiment in accordance with the present invention to a bumper.
Figure 3B:
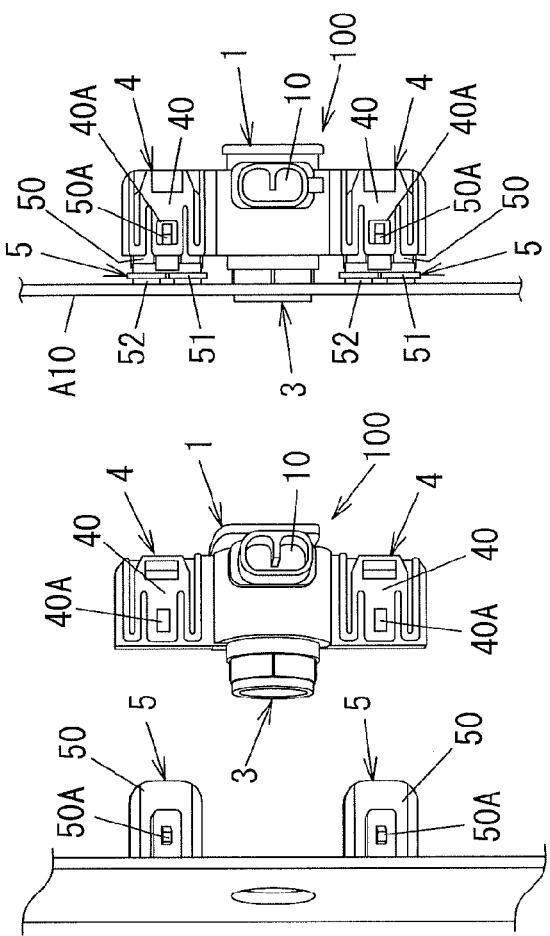

In order to attach the sensor body 1 to the bumper A10, as shown in FIGS. 3A and 3B, first, a pair of mounting bases 5 are bonded to the bumper A10 by use of the adhesive sheets 52. In more detail, the respective mounting bases 5 are bonded to the bumper A10 so that the attachment hole A11 is positioned between the mounting bases 5. Note that method for attaching the respective mounting bases 5 to the bumper A10 is not limited to bonding by use of the adhesive sheet 52, but another method may be employed.

Figure 3C:
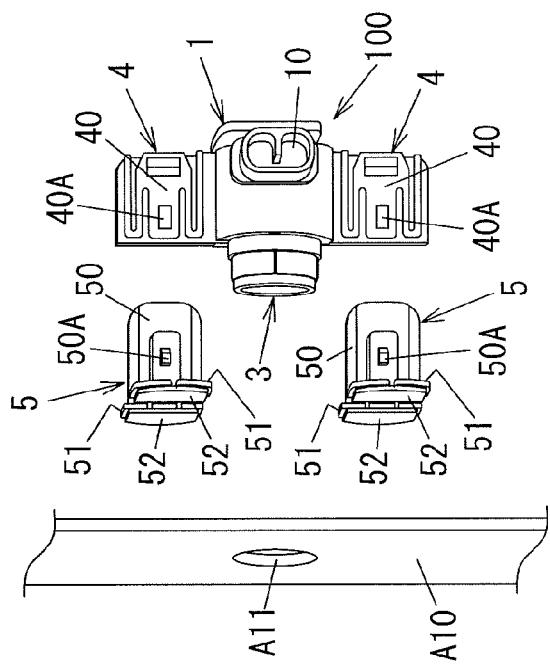

Next, each of the standing pieces 50 of the mounting base 5 is inserted between the corresponding first main piece 40 and the corresponding second main piece 41 of the fixing part 4 to set the corresponding projection 50A in the corresponding insertion hole 40A, and thereby the mounting bases 5 are interlocked with the fixing parts 4, respectively. In parallel with this process, a front end of the cover 3 is inserted into the attachment hole A11. By attaching the fixing parts 4 to the mounting bases 5, respectively, in this manner, the sensor body 1 can be attached to the bumper A10 (see FIG. 3C).

The following brief explanations are made to operation of the ultrasonic sensor 100 of the present embodiment. The control circuit of the circuit board is activated by electric power supplied from the external power source via the connector 10. A drive pulse signal output by the control circuit is transmitted to the wave transmitting and receiving device 2, and the wave transmitting and receiving device 2 receives the drive pulse signal and sends an ultrasonic wave. Next, the wave transmitting and receiving device 2 receives a wave caused by reflection of the ultrasonic wave at an obstacle, and sends a wave receiving signal to the control circuit. The control circuit calculates a distance to the obstacle based on time from sending of the drive pulse signal to receiving of the wave receiving signal. Thereby, the ultrasonic sensor 100 of the present embodiment is configured to judge whether an obstacle is present within a detection area and, in the event that the obstacle is present, calculate a distance from the ultrasonic sensor 100 to the obstacle.

Figure 4A:
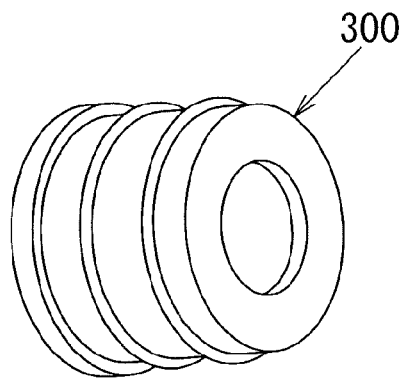
FIG. 4A is a perspective view illustrating a cover of a conventional ultrasonic sensor.

Vibration of the piezoelectric element is transmitted to not only a front surface of the wave transmitting and receiving device 2, but also a side surface of the wave transmitting and receiving device 2. Due to this, the vibration transmitted from the side surface of the wave transmitting and receiving device 2 may reach the sensor body 1 and the bumper A10 and thereby wrong detection may occur. In the conventional ultrasonic sensor, as shown in FIG. 4A, the cover 300 covering the wave transmitting and receiving device 2 so as to expose the wave transmitting and receiving surface 21 suppresses unwanted vibration transmitted from the side surface of the wave transmitting and receiving device 2.

Figure 4B:
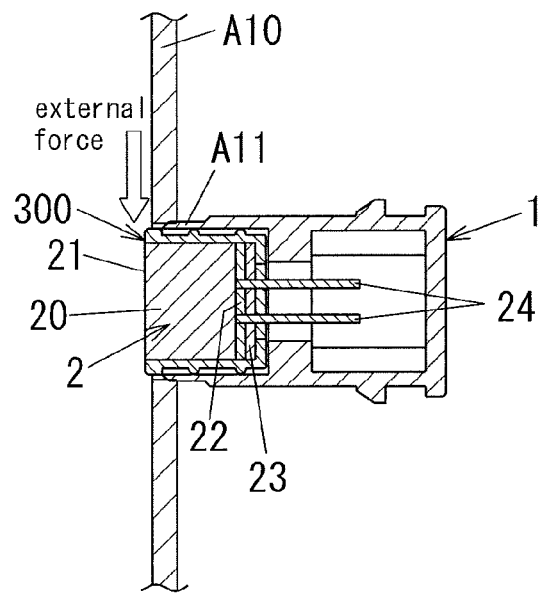
FIGS. 4B and 4C are sectional views each illustrating a scene where external force is applied to the cover of the conventional ultrasonic sensor.
Figure 4C:
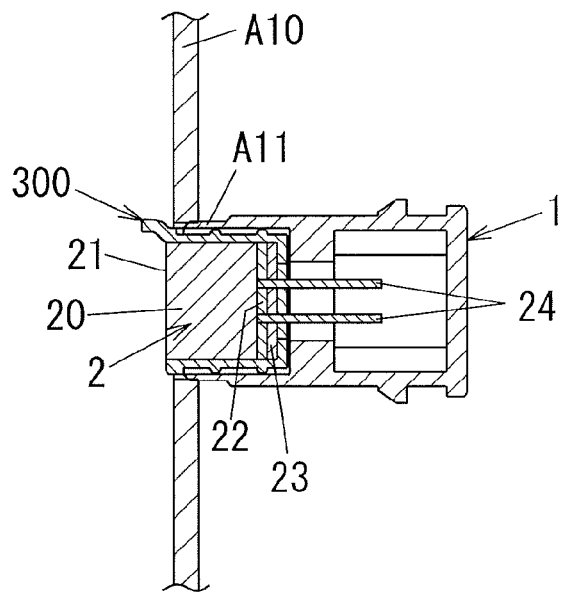

The cover 300 is made of single resin material such as silicone rubber and formed into a hollow cylindrical shape having a bottom. In other words, the cover 300 is formed into a hollow cylindrical shape and has a bottom portion at a back end of the cover 300. However, with regard to the conventional ultrasonic sensor, as shown in FIGS. 4B and 4C, when external force is applied to part of the cover 300 which projects from the bumper A10, the cover 300 may be stretched because the whole strength of the cover 300 is poor. Therefore, external force is likely to cause rolling up of part of the cover 300, and consequently a partial lift of the cover 300 is likely to occur (part of the cover 300 is likely to be lifted).

Figure 5A:
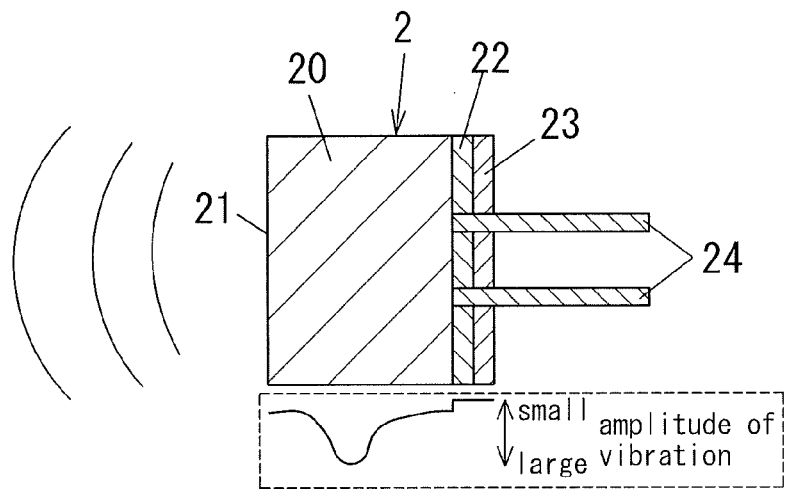
FIG. 5A is an explanatory view of the cover of the conventional ultrasonic sensor.
Figure 5B:
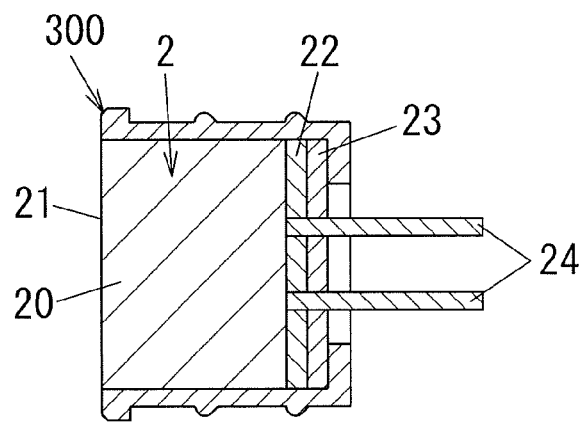
FIG. 5B is a sectional view illustrating a primary part of the conventional ultrasonic sensor.
Figure 5C:
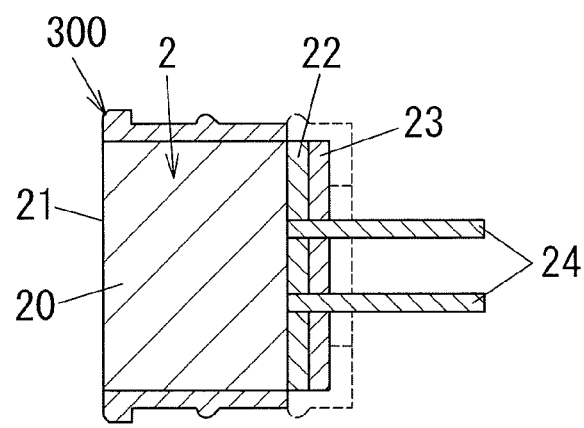
FIG. 5C is a sectional view illustrating a primary part of the conventional ultrasonic sensor shown in FIG. 5B, where an unnecessary portion is omitted.

It is known that, as shown in FIG. 5A, the vibration of the piezoelectric element is transmitted toward a side of the case 20, but is unlikely to be transmitted toward a back of the case 20. The reason is that the spacer 22 and the base 23 for absorption of vibration are attached to a back end of the case 20. Therefore, as shown in FIG. 5B, it is not necessary to wholly cover the side surface and the bottom surface of the case 20 with the cover 300, and as shown in FIG. 5C, by covering the side surface only of the case 20 with the cover 300, it is possible to suppress undesired vibration transmitted from the wave transmitting and receiving device 2. That is, it is not necessary to make the bottom portion 31 of the cover 300 of material having a low elastic modulus for the purpose of vibration damping.

Hence, in the ultrasonic sensor 100 of the present embodiment, as shown in FIGS. 1A and 1B, the cover 3 is made of multiple materials (two materials herein) different from each other. Specifically, the side portion 30 of the cover 3 which covers the side surface of the wave transmitting and receiving device 2 is made of silicone rubber. Further, the bottom portion 31 of the cover 3 which covers the bottom surface of the wave transmitting and receiving device 2 is made of silicone rubber having a greater elastic modulus than the silicone rubber for the side portion 30. Therefore, the cover 3 of the ultrasonic sensor 100 of the present embodiment has greater strength than the conventional cover 300.

Figure 1C:
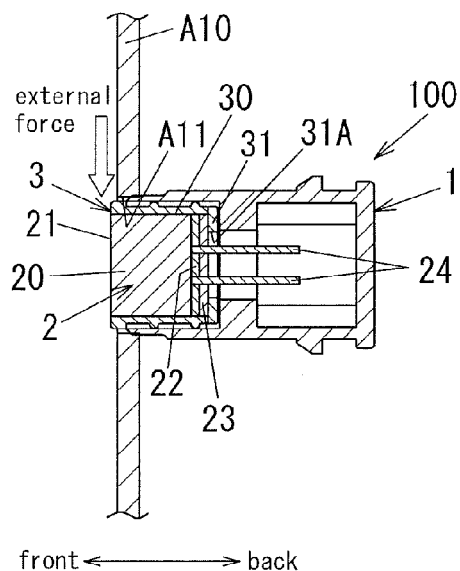
FIGS. 1C and 1D are sectional views each illustrating a scene where external force is applied to the cover of the ultrasonic sensor of the embodiment in accordance with the present invention.
Figure 1D:
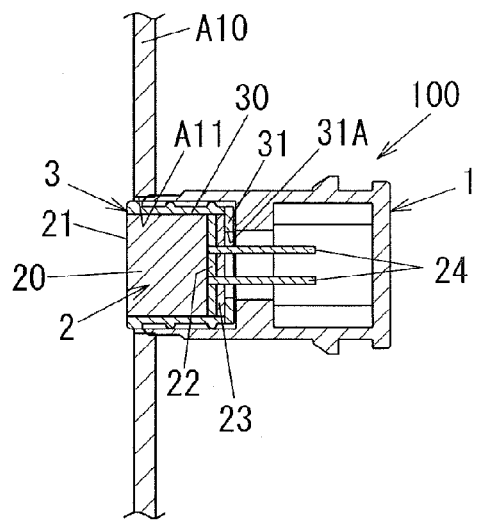

Therefore, with regard to the ultrasonic sensor 100 of the present embodiment, as shown in FIGS. 1C and 1D, even when external force is applied to part of the cover 3 which projects from the bumper A10, the cover 3 is unlikely to be stretched because the whole strength thereof is high. Thus, the ultrasonic sensor 100 of the present embodiment can suppress occurrence of a partial lift of the cover 3 (part of the cover 3 is lifted) due to rolling up of part of the cover 3 caused by external force. Specifically, in the ultrasonic sensor 100 of the present embodiment, the bottom portion 31 of the cover 3 is made of material having a great elastic modulus and therefore the bottom portion 31 is unlikely to be changed in shape even when external force is applied to part of the cover 3. Therefore, with respect to the ultrasonic sensor 100 of the present embodiment, the bottom portion 31 is unlikely to be changed in shape and accordingly it is possible to prevent the side portion 30 from being stretched and suppress occurrence of a partial lift of the cover 3 (part of the cover 3 is lifted) due to rolling up of part of the cover 3 caused by external force.

Note that, in the ultrasonic sensor 100 of the present embodiment, the side portion 30 and the bottom portion 31 of the cover 3 are respectively made of materials different from each other. However, the cover 3 may be constituted by three or more portions, and the portions may be respectively made of materials different from each other. This configuration can also achieve an effect to suppress occurrence of a partial lift of the cover 3 (part of the cover 3 is lifted) due to rolling up of part of the cover 3 caused by external force.

As mentioned above, the ultrasonic sensor 100 of the present embodiment has the following first feature.

In the first feature, the ultrasonic sensor 100 of the present embodiment includes the wave transmitting and receiving device 2, the cover 3 and the sensor body 1. The wave transmitting and receiving device 2 is configured to transmit and receive an ultrasonic wave. The cover 3 covers the wave transmitting and receiving device 2 so as to expose the wave transmitting and receiving surface 21. The sensor body 1 is to accommodate the wave transmitting and receiving device 2 and the cover 3. The cover 3 is constituted by multiple portions, and the multiple portions are individually made of multiple materials different from each other.

In other words, the ultrasonic sensor 100 of the present embodiment includes the wave transmitting and receiving device 2 and the cover 3. The wave transmitting and receiving device 2 has a front surface including the wave transmitting and receiving surface 21 and is configured to transmit and receive an ultrasonic wave through the wave transmitting and receiving surface 21. The cover 3 covers the wave transmitting and receiving device 2 so as to expose the wave transmitting and receiving surface 21. The cover 3 is constituted by multiple portions, and the multiple portions are individually made of multiple materials different from each other.

The ultrasonic sensor 100 of the present embodiment may have the following second feature realized in combination with the first feature.

In the second feature, the ultrasonic sensor 100 of the present embodiment further includes the sensor body 1 accommodating the wave transmitting and receiving device 2 and the cover 3 so as to expose the wave transmitting and receiving surface 21.

The ultrasonic sensor 100 of the present embodiment may have the following third feature realized in combination with the first or second feature.

In the third feature, the cover 3 includes the side portion 30 covering the side surface of the wave transmitting and receiving device 2, and the bottom portion 31 which covers a bottom surface of the wave transmitting and receiving device 2 and is made of a material different from a material of the side portion 30. The material of the bottom portion 31 has a greater elastic modulus than the material of the side portion 30.

The ultrasonic sensor 100 of the present embodiment may have the following fourth feature realized in combination with the third feature.

In the fourth feature, the side portion 30 of the cover 3 is made of silicone rubber. The bottom portion 31 is made of silicone rubber having a greater elastic modulus than the silicone rubber used for making the side portion 30.

The ultrasonic sensor 100 of the present embodiment may have the following fifth feature realized in combination with any one of the first to fourth features.

In the fifth feature, the cover 3 is provided as a single object by processing the multiple materials by simultaneous molding.

In other words, the cover 3 is provided as a single object by forming the multiple portions integrally by simultaneous molding.

The ultrasonic sensor 100 of the present embodiment may have the following sixth feature realized in combination with any one of the first to fourth features.

In the sixth feature, the cover 3 is provided as a single object by bonding the multiple materials.

In other words, the cover 3 is provided as a single object by bonding the multiple portions together.

As clearly understood from the above-described present embodiment of the present invention, the cover 3 is made of multiple materials different from each other so as to enhance strength of the cover 3. Therefore, the present invention can suppress occurrence of a partial lift of the cover 3 (part of the cover 3 is lifted) due to rolling up of part of the cover 3 caused by external force.

The invention claimed is:

1. An ultrasonic sensor, comprising:
 a wave transmitting and receiving device, including:
  a piezoelectric element configured to transmit and receive an ultrasonic wave, and
  a case which accommodates the piezoelectric element and which has a front surface including a wave transmitting and receiving surface; and
 a cover for covering the wave transmitting and receiving device so as to expose the wave transmitting and receiving surface, the cover being made of resin,
 wherein the cover includes a side portion covering a side surface of the wave transmitting and receiving device, and a bottom portion which covers a bottom surface of the wave transmitting and receiving device; and
 an elastic modulus of the bottom portion of the cover is greater than an elastic modulus of the side portion of the cover.

2. The ultrasonic sensor according to claim 1, further comprising a sensor body accommodating the wave transmitting and receiving device and the cover so as to expose the wave transmitting and receiving surface.

3. The ultrasonic sensor according to claim 1, wherein:
 the side portion is made of silicone rubber; and
 the bottom portion is made of silicone rubber having a greater elastic modulus than the silicone rubber used for making the side portion.

4. The ultrasonic sensor according to claim 1, wherein the cover is provided as a single object by forming the side portion and bottom portion integrally by simultaneous molding.

5. The ultrasonic sensor according to claim 1, wherein the cover is provided as a single object by bonding the side portion and bottom portion together.

* * * * *